Jan. 21, 1941.                L. M. DAVIS                2,229,239
                              FISHING PLUG
                           Filed June 23, 1938
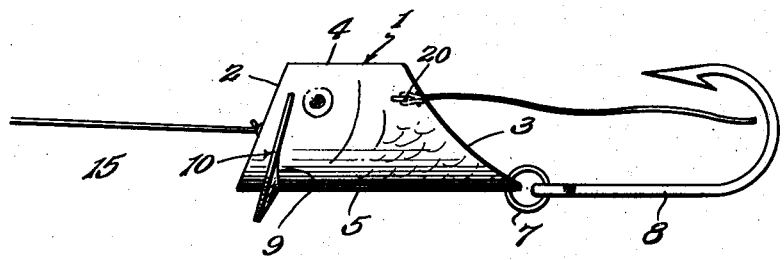
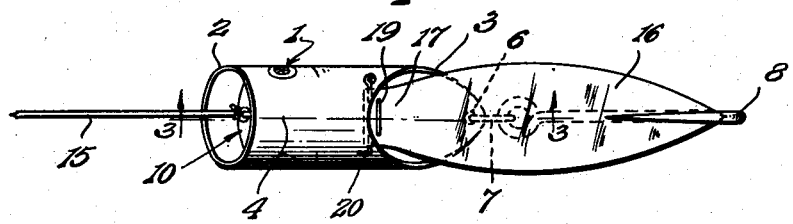
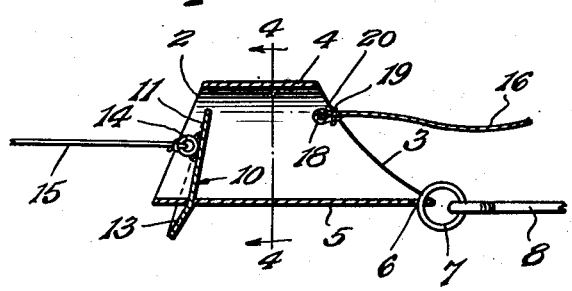     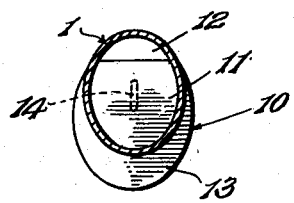
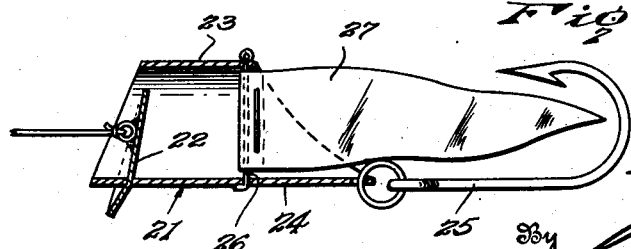
Inventor
Lester M. Davis.
By Lacey & Lacey,
Attorneys Patented Jan. 21, 1941

2,229,239

UNITED STATES PATENT OFFICE 2,229,239

FISHING PLUG

Lester M. Davis, Tacoma, Wash.

Application June 23, 1938, Serial No. 215,478

8 Claims. (Cl. 43—46)

This invention relates to an improved fishing plug.

The invention has, as one of its objects, to provide a device of this character wherein the body employed is fitted with a fin and a tail, the fin serving to deflect a flow of water to pass through the body and effect wriggling movement of the tail for attracting fish to a hook carried by the body.

Another object of the invention is to provide a fishing plug having an oval body which is kerfed near its upper end to receive the fin and is otherwise of such construction that a flow of water striking the forward portion of the body will be caused to rise against the fin and be deflected thereby to pass through the body.

As a further object, the invention seeks to provide a fishing plug having a body with ends inclined with respect to the length of said body and a fin mounted in the body at an angle to the length of the body, said inclined ends and fin imparting a wriggling movement to the body as said body moves through the water.

A further object of the invention is to provide a fishing plug which is simple in construction and efficient in operation.

Other objects of the invention, not mentioned hereinbefore, will become apparent during the course of the following description.

My invention is illustrated in the accompanying drawing, wherein:

Figure 1 is a side elevation of my improved fishing plug.

Figure 2 is a top plan view of the device.

Figure 3 is a longitudinal sectional view of the fishing plug.

Figure 4 is a vertical sectional view on the line 4—4 of Figure 3, looking in the direction indicated by the arrows.

Figure 5 is a longitudinal sectional view showing a slightly modified embodiment of the invention.

Referring now more particularly to the drawing, wherein like reference numerals indicate like parts, the numeral 1 indicates, in general, the body of my improved fishing plug. The body 1 is formed of brass or other suitable metal and, as may be seen in Figure 4, is substantially elliptical in cross section and is hollow, or tubular, throughout its length. The tubular body 1 has open ends 2 and 3 which are inclined with respect to the length of said body. That is to say, the ends 2 and 3 converge in the same direction. The degree of convergence of the end 2 is considerably less than that of the end 3. As will be further observed, the end 3 is not only inclined but is slightly curved throughout its length. For the purpose of convenience, I will designate the the body 1 as being provided with a top portion 4 and a bottom portion 5, although, as stated, the body is formed from a single piece of tubular material. The bottom portion 5 is of considerably greater length than that of the top portion, due to the inclined ends 2 and 3, and said bottom portion is formed, in the end 3 and near the free edge thereof, with an opening 6. The opening 6 is adapted to receive a swivel or ring 7 which swingingly connects a hook 8 with the body. The hook 8 may, of course, be of any desired type and no claim is made thereto in this application.

The body 1, near the end 2, is formed with a kerf 9 which is cut into said body from the bottom portion 4 and extends therein throughout the the major portion of the height of said body. The kerf 9 is adapted to receive a fin generally indicated at 10. The kerf, as best seen in Figure 3, is disposed nearly at right angles to the length of the body so as to give a very slight upward inclination to the fin now to be described with more particularity.

The fin is substantially spoon shaped and has a substantially flat surface 11 which extends throughout the major portion of the height of the body, said fin terminating short of the top portion 4 to define a restricted water passage or opening 12. The portion of the fin, as best seen in Figures 1, 3 and 4, which remains exteriorly of the body is directed slightly upwardly and has its greatest portion disposed at the front of the body and in the same longitudinal plane with the opening 6. The portion of the fin exteriorly of the body is indicated at 13 and, as clearly shown in Figure 3, is dished or concavo-convex in shape. The edges of the fin merge into the side walls of the body and meet said side walls at the inner extremity of the kerf 9. Mounted in the portion 11 of the fin 10, medially thereof, is an attaching ring 14 which is adapted to have attached thereto the end of a fishing line 15.

Attached to the body 1 near the end 3 and the top portion 4 thereof, is a tail 16 formed of thin sheet rubber, fabric, or other suitable material and painted so as to resemble a fish. The body 1 is, of course, painted in a like manner. The tail is substantially elliptical in contour and has a relatively wide forward portion 17 which is folded upon itself to define a loop 18. The folded portion is fixed to the tail proper by means of a clip 19. In order to mount the tail in the body I provide a cross rod 20 which extends laterally through the side walls of the body near the top portion 4 and has its ends bent so that said rod may be retained in proper position within the body. The rod extends through the loop 18 and, therefore, connects the tail to the body in a highly efficient manner. It will be noted that the tail is disposed in the same longitudinal plane with the opening 12.

In operation, after the device has been secured to the fishing line 15 and the hook 8 is baited, the line is cast. As the line is pulled through the water, a flow of water will strike against the portion 5 and will be deflected against the portion 13 of the fin 10 and will be deflected by said fin past the forward end of the body and through the opening 12 and through the hollow body of the plug. The flow of water will, of course, strike the tail 16 and will cause the tail to wobble in a life-like manner. In view of the fact that the body is provided with the ends 2 and 3 which converge toward each other at different angles, the body will be caused to wobble in the water and will, therefore, cause the flow of water therethrough not to pursue a uniform course. Thus, the tail 16 will be caused to wriggle in a more lifelike manner than would be the case if the body were permitted to pass through the water without continuous shifting motion. The fin 10 is, of course, largely responsible for the wriggling of the body as it passes through the water. In view of the fact that the fin extends within the body and defines the restricted opening 12, the flow of water is accorded a much greater pressure which, of course, causes the tail to wriggle vigorously and in an erratic manner.

Referring now to the modification of the invention as shown in Figure 5, the numeral 21 indicates the body of the device, which is in every respect similar to the body 1. The fin is shown at 22. The body is provided with top and bottom portions 23 and 24 and the portion 24 has a hook 25 connected thereto at its rear end. Extending axially through the plug from the top portion 23 to the bottom portion 24 is a mounting rod or pin 26. The mounting rod 26 supports a tail 27 which is similar to the tail 16. With regard to this embodiment of the invention, it is desired to state that the only difference between it and the preferred form is that the tail 27 is mounted in a plane at right angles to the top and bottom portions 23 and 24 whereas in the preferred form, the tail 16 is mounted in the same horizontal plane as the planes of the top and bottom portions 4 and 5. The modification operates in a manner identical with that of the preferred form.

Having thus described the invention, what I claim is:

1. In a fishing plug, a substantially elliptical body having top and bottom portions and inclined ends converging toward each other and toward the top portion, the angle of inclination of one of said ends being greater than that of the other with respect to the length of the body, one of said ends being slightly curved, a mounting rod carried by the body near the top portion, a tail swingingly connected with the mounting rod, and a fin carried by the body and defining a restricted water passage, said fin having an outer portion for deflecting a flow of water to pass through the passage, through the body and about the tail for imparting a wriggling motion to the tail and thus to the body for attracting fish to a hook carried by the body.

2. In a fishing plug, a body, a hook carried thereby, a tail of flexible material, means swingingly connecting the tail with the body, said body being hollow and said tail being disposed to be impinged by a flow of water through the body, a fin carried by the body near the end opposite that carrying the tail, said fin having a portion defining a restricted water passage and having an outer portion adapted to deflect a flow of water through the water passage to flow about the tail and impart a wriggling motion to the tail whereby the body will be given a wriggling motion, said wriggling body and tail attracting fish to the hook, and means carried by the fin for connecting the plug to a fishing line.

3. In a fishing plug, a body having upper and lower portions and having ends converging toward each other and toward said upper portion, said body having a kerf cut therein from the lower portion, said kerf extending throughout the greater portion of the height of the body, a fin carried by the body and having a substantially flat portion thereof within the body and kerf, said fin having a concavo-convex outer portion with its edges merging into the walls of the body, said substantially flat portion defining a restricted water passage and said outer portion being adapted to direct a flow of water over the end of the body and through the restricted water passage, a tail, means swingingly connecting the tail with the body, said tail being of flexible material, and a hook carried by the body, said tail being adapted to be given a wriggling movement by the flow of water through the body from the restricted water passage whereby the entire body will be given a wriggling motion for attracting fish to the hook.

4. In a fishing plug, a hollow body having a kerf cut therein, and a fin carried in the kerf and having a portion exteriorly of the body for deflecting a flow of liquid through said body.

5. In a fishing plug, a hollow body, a fin carried by the body and extending therein at substantially right angles to the axis of the body, said fin having an outer portion for deflecting a flow of liquid through the body, said fin terminating at its inner extremity short of the wall of the body diametrically opposite the outer portion for restricting flow of the liquid through the body.

6. In a fishing plug, a hollow body, and a spoon-shaped fin carried by the body and extending substantially at right angles to the axis of the body, said fin having an inner portion terminating short of a portion of the wall of the body for restricting flow of a liquid through said body, and means carried by said portion for attaching a line.

7. In a fishing plug, a hollow body, a fin carried by the body and having a portion therein for restricting flow of a liquid through the hollow body, said fin having an outer portion for deflecting a liquid to flow through the body past said first-mentioned portion, and a tail carried at the opposite end of the body in the path of the flow of liquid through the body to be given undulating movement by said flow.

8. In a fishing plug, a hollow body, a fin carried by the body in a plane substantially at right angles to the length of the body, said fin having a portion for restricting flow of a liquid through the body, a mounting rod extending chordally of the body and in a path of the normal flow of liquid through the body, and a tail swingingly connected with the mounting rod, said tail being adapted to be given a wriggling movement by the flow of liquid through the body.

LESTER M. DAVIS.